UNITED STATES PATENT OFFICE.

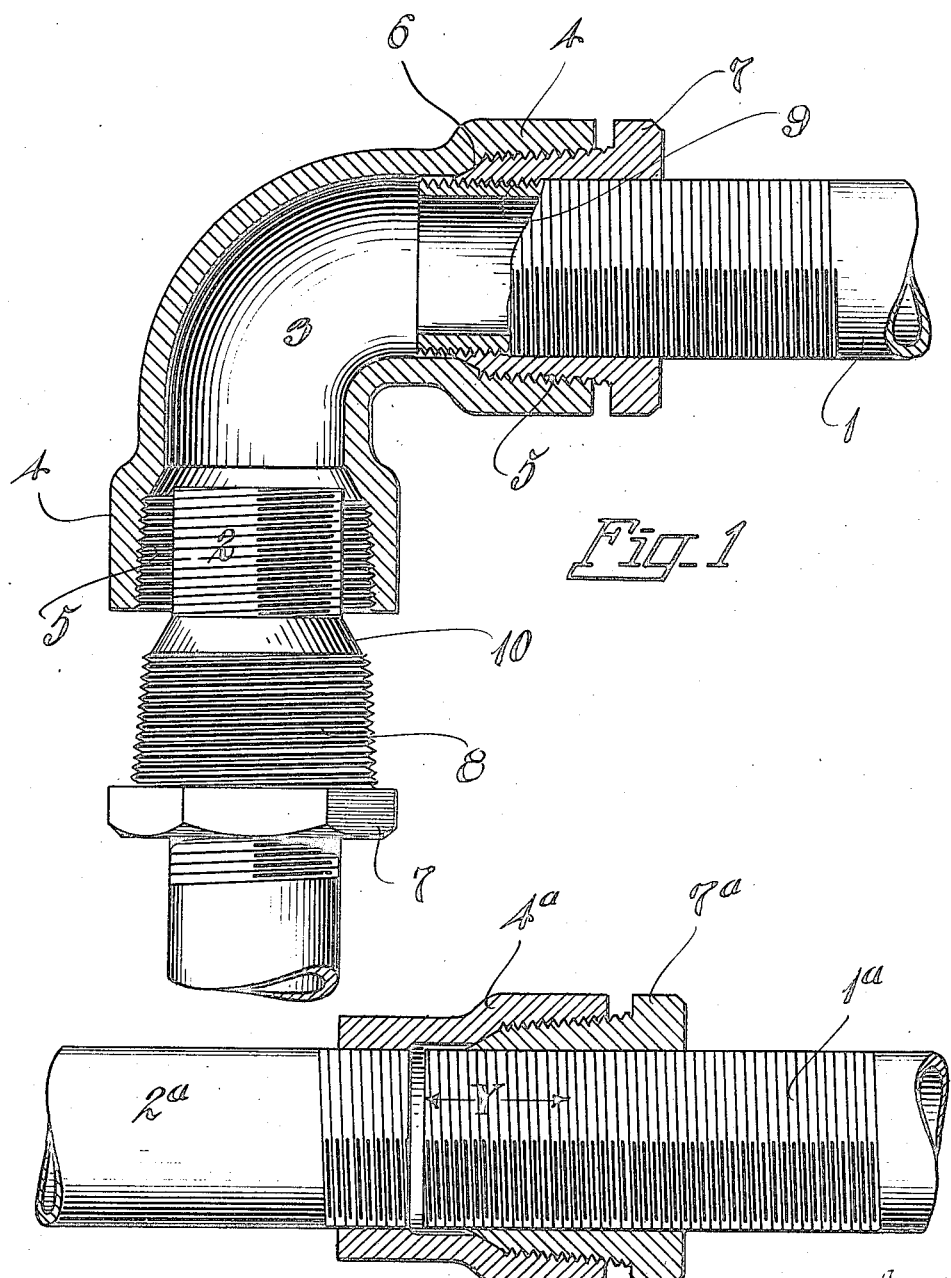

LOUIS L. FREUND, OF SPOKANE, WASHINGTON, ASSIGNOR OF ONE-HALF TO JOHN E. SAUCEREAU, OF SPOKANE, WASHINGTON.

PIPE-COUPLING.

1,372,876. Specification of Letters Patent. Patented Mar. 29, 1921.

Application filed January 8, 1920. Serial No. 349,849.

*To all whom it may concern:*

Be it known that I, LOUIS L. FREUND, a citizen of the United States, residing at Spokane, in the county of Spokane and State of Washington, have invented certain new and useful Improvements in Pipe-Couplings, of which the following is a specification.

My present invention relates to improvements in pipe couplings and involves a pipe fitting or joint adapted for wide range of use in plumbing and heating where numerous joints and couplings are required, as for instance in the installation of hot water tanks and for other similar purposes.

By the utilization of my invention I eliminate the necessity, as at present required, of close fitting and accurate measurement and cutting of pipe ends in making the coupling or joint, thus saving time and labor, and a joint or coupling when made according to my invention avoids the employment of expensive union couplings, sleeves, or nuts, to make a water tight joint. The joint comprises a minimum of parts thus enhancing its utility, and at the same time provides a well sealed and tight structure for performing the functions for which it is intended.

The invention consists essentially in the combination and arrangement of the two adjoining pipe ends with a joint element and a coupling member or nut in which the parts are especially constructed with relation to each other as will be hereinafter pointed out and claimed.

In the accompanying drawings I have illustrated one complete example of the physical embodiment of my invention constructed and arranged according to the best mode I have so far devised for the practical application of the principles of my invention.

Figure 1 is a sectional view of a joint or coupling embodying the invention in an elbow joint, parts being illustrated in elevation.

Fig. 2 is a partial sectional view illustrating the invention as a straight joint.

For the purpose of illustrating my invention I have employed the two pipe ends 1 and 2 as shown, having the usual exterior threads and forming part of a joint in use with a hot water tank of a heating system of usual construction. And in connection with the pipe ends to be joined I have utilized an elbow fitting as 3 especially constructed to meet the requirements of my invention, with socket heads 4, 4, disposed at the usual angle, and each fashioned with an interior bore tapered inwardly and provided with interior screw threads as 5, 5. The two sockets are of sufficient diameter to freely receive the pipe ends 1 and 2 inserted therein, and at the inner ends of the threaded tapered portions, the sockets are fashioned with annular beveled faces 6, 6, which merge into the minimum bore of the elbow fitting as shown.

The coupling member 7 is in the form of a nut having an exterior, tapered, threaded portion 8, complementary to the interior threads of the socket or sleeve member 4, and also fashioned with interior threads 9 to engage the threads of the pipe ends as shown. The inner or front end of the nut is preferably formed with a tapered face at 10 to co-act with the beveled face 6 in the socket 4, and these two complementary faces form a water tight, sealed, joint at the inner end of the coupling nut, when the nut is turned home in making the joint. The parts are of course, all of metal, and made in suitable sizes and shapes for differing purposes, and in fitting, the nut is first backed or threaded onto the end of the pipe, a suitable distance to permit the insertion of the pipe end into the socket the required distance to make the joint. After the length has been properly adjusted, with the end of the pipe projected into the socket, the nut is then turned on the pipe end to engage the exterior teeth of the nut with the interior teeth of the socket, and the nut is turned home, compressing the pipe end, with the result that nut is closely sealed in between the exterior threads of the pipe and the interior threads of the socket to form a close and tight fitting joint. The joint is further sealed by the close frictional contact of the beveled faces 6 and 10 of the socket and nut respectively, and in this manner a fluid tight seal is secured between the joint members that is capable of withstanding excessive strains and secures a rigid and firm fitting of the parts.

In the straight joint of Fig. 2 where the pipe ends $1^a$ and $2^a$ are alined, the tapered socket $4^a$ is threaded directly on one end of one of the pipes, and the complementary tapered nut $7^a$ is threaded in between the socket and the other pipe end, thus securing a well sealed water tight straight joint for the pipes.

In both instances it will be apparent that close adjustment of the pipe ends is not necessary, for the reason that the elongated threaded end of the pipes may receive the coupling nut and the nut be shifted thereon in making the fitting until the desired adjustment is accomplished with the end carrying the nut projecting into the socket, and in the case of the straight joint the distance indicated at $v$ on the pipe end $1^a$ may be utilized in the adjustment.

The action of the tapered nut in its complementary socket, in conjunction with the pipe end, ordinarily is sufficient to make a tight fit, but in some instances, especially when high fluid pressure is present the beveled faces of the nut and socket are utilized to secure the sealed joint to prevent leaks.

Such a joint as that of the present invention is especially valuable in the elimination of union couplings, and may be employed to repair breaks in pipe lines, as for instance as shown in Fig. 2. In case of a break in a pipe section, the broken part is cut out, and a socket head $4^a$ is threaded on the end of the pipe $2^a$, after which the new threaded end $1^a$ of pipe is fitted with the coupling nut $7^a$, and the latter adjusted thereon. The end $1^a$ is then inserted in the socket member $4^a$ and the nut screwed home to make the joint.

What I claim is—

The combination in a coupling with a socket member rigid with and forming a continuation of a pipe, said member provided with an inwardly tapered threaded portion and a beveled annular face, of a pipe end, a nut externally threaded thereon and fashioned with an exterior tapered threaded portion complementary to the socket member, and a beveled face on the nut end complementary to the beveled annular face of the socket forming a closed inner joint.

In testimony whereof I affix my signature.

LOUIS L. FREUND.